United States Patent Office 3,442,891
Patented May 6, 1969

3,442,891
STEROIDAL 4,6-DIEN-3-ONES HAVING $C_6$ SUBSTITUENTS AND PROCESS FOR PREPARING SAME
Derek Burn, Robert Victor Coombs, and Vladimir Petrow, London, England, assignors to The British Drug House Limited
No Drawing. Filed Feb. 8, 1966, Ser. No. 525,845
Claims priority, application Great Britain, Feb. 25, 1965, 8,200/65
Int. Cl. C07c *173/00, 169/22, 169/34*
U.S. Cl. 260—239.55                    15 Claims

ABSTRACT OF THE DISCLOSURE

New steroidal-4,6-dien-3-ones having at $C_6$ the group $CH_2XR$ wherein X is an atom of sulfur or oxygen and R is an alkyl or aryl group containing up to 20 carbon atoms. The compounds are prepared by reacting a corresponding 6-halomethyl steroid with a metallic salt of the formula M.X.R where M is the metal and X and R have the meaning given above.

---

This invention is for improvements in or relating to organic compounds and has particular reference to new steroidal 4,6-dien-3-ones with an oxy(thio)methyl substituent at $C_6$.

In our copending applications Nos. 514,676 filed Dec. 17, 1965 and 523,247, filed Jan. 27, 1966 there are described steroidal 6-halomethyl-4,6-dien-3-ones including the partial formula

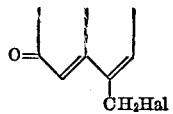

(where Hal is F, Cl, Br and I), and processes for their preparation.

We have now made the important discovery that the halogen atom present in such steroidal 6-halomethyl-4,6-dien-3-ones including partial Formula II above may be replaced without rearrangement to give products including the partial Formula I below. This is a significant and surprising discovery as allylic structures, as will be known to those skilled in the art, often undergo structural rearrangements when submitted to substitution reactions. We have also made the discovery that some of the novel 6-substituted steroidal 4,6-dien-3-ones including the partial Formula I below can have biological properties which render them of value in the art. In addition, such 6-substituted steroidal 4,6-dien-3-ones including the partial Formula I below are of value as building blocks for the construction of novel hormonally active structures and thus have a technical importance in their own right as intermediates.

In general terms, the products of the invention can have biological properties qualitatively similar or related to the biological properties of the corresponding 6-methyl- and 6-hydroxy(acyloxy)methyl-3-oxo-4,6-dienic steroids (our copending application S.N. 457,522 filed May 20, 1965, now issued on Mar. 26, 1968 as Patent No. 3,375,167). Thus, for example, derivatives of the 19-nortestosterone type may have claudogenic activity. Progesterone and 17α-alkyl(acyl)progesterone derivatives may have progestational and claudogenic activity. In conjunction with an oestrogen such for example as ethynyloestradiol, mestranol, 17α-chlorethynyl (17α-bromoethynyl) oestradiol and its 3-methyl and 3,17-dimethyl ether, 17α-trifluoropropynyl oestradiol and its 3-methyl and 3,17-dimethyl ether, 17α-trifluorovinyl oestradiol and its 3-methyl and 3,17-dimethyl ether, the compounds of the present invention are of value as oral contraceptives and as anti-tumour agents in experimental assays. In addition, the compounds are of value in veterinary work for the synchronisation of oestrus and for inhibition of ovulation. Such formulations may be administered as pills, tablets and other standard pharmaceutical formulations either in the conventional 20 days/month regimens or in sequential or serial regimens. Corticoidal structures may show some of the properties of glucocorticoids. Substituents of the type $—X(CH_2)_nNEt_2$ may additionally confer CNS and hypocholesteraemic properties upon the structures.

According to the present invention there is provided a process for the preparation of 6-oxy(thio)methyl steroidal-4,6-dien-3-ones including the partial formula

where X is —O— or —S— and R is selected from the group consisting of hydrogen acyl (where acyl may be derived from aliphatic, aromatic, heterocyclic and alkaromatic moieties containing up to 20 carbon atoms), alkyl and cycloalkyl groups containing up to 20 carbon atoms, aryl and alkaryl groups containing up to 20 carbon atoms and alkylamino groups of the type $(CH_2)_nN<$ containing up to 12 carbon atoms, and including substituted derivatives of the above, which process comprises reacting a 6-halomethyl-4,6-dien-3-one including the partial Formula II above where Hal is F, Cl, Br or I, with a metallic salt of the formula M.X.R where M is Na, K or Li and X and R have the same meaning as above.

The process is carried out in solution or suspension in a dry organic solvent, when the following reaction occurs

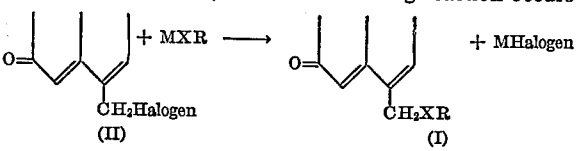

after which the product may be isolated and purified by standard methods described in the art.

The invention also provides new 6-oxy(thio)methyl steroidal-4,6-dien-3-ones including the partial Formula I above, where X is —O— or —S— and R is an alkyl or cycloalkyl group containing up to 20 carbon atoms, an aryl or alkaryl group containing up to 20 carbon atoms, or an alkylamino group of the type $(CH_2)_nN<$ containing up to 12 carbon atoms or a substitution derivative of any of the above or when X is —S—, R is hydrogen or an acyl radical (where acyl is derived from aliphatic, aromatic, heterocyclic or alkaromatic moieties containing up to 20 carbon atoms).

The process of the present invention may be applied to a wide variety of steroidal compounds of the androstane, 19-norandrostane, pregnane and 19-norpregnane series which, in addition to the 6-substituted 4,6-dien-3-one present in rings A and B, may also be substituted by Hydroxyl groups and esterified and etherified derivatives thereof in such positions as $C_{11}$, $C_{12}$, $C_{14}$, $C_{15}$, $C_{16}$, $C_{17}$, $C_{18}$, $C_{19}$, $C_{20}$ and $C_{21}$, including such groups as 16-hydroxymethyl and the condensation products of 16α, 17α- and 17α,21-glycols with carbonyl components.
Carbonyl groups in such positions as $C_{11}$, $C_{12}$, $C_{15}$, $C_{16}$, $C_{17}$, $C_{18}$ and $C_{20}$.
Carbalkoxy groups in such positions as $C_{13}$, $C_{16}$, $C_{17}$ and in the side-chain.
Cyano groups in such positions as $C_{13}$, $C_{16}$ and $C_{17}$.
Alkyl groups and in particular methyl groups in such positions as $C_2$, $C_{11}$, $C_{16}$, $C_{17}$, $C_{21}$ and ethyl groups in such positions as $C_{17}$.

Alkenyl and alkynyl groups and in particular vinyl, allyl, ethynyl, trifluoropropynyl, trifluorovinyl and chloroethynyl groups at $C_{17}$.

Methylene and ethylidene groups in such positions as $C_{11}$, $C_{16}$, $C_{16}$:$C_{17}$ and $C_{17}$.

Lactone, ether and spiroketal groups and in particular spirolactone groups including —O—CO—$CH_2$—$CH_2$— at $C_{17}$, etheric groups at $C_{16}$ and bridging $C_{18}$ and $C_{20}$ and spiroketal groups including the sapogenin sidechain.

Fluorine atoms in particular at $C_9$.

Unsaturated linkages including carbon-carbon doublebonds in such positions as $C_1$, $C_{9(11)}$, $C_{11}$, $C_{14}$, $C_{15}$, $C_{16}$ and $C_{17(20)}$.

The process of the present invention may be applied to the 6-halomethyl-4,6-dien-3-one compounds derived from the following steroids and their acyl derivatives:

testosterone and 19-nor derivatives thereof
2-methyltestosterone and 19-nor derivatives thereof
17α-methyltestosterone and 19-nor derivatives thereof
9(11)-dehydro-17α-methyltestosterone and 19-nor derivatives thereof
17α-propynyl, 17α-chloroethynyl, 17α-trifluoropropynyl, 17α-trifluorovinyl testosterone and 19-nor derivatives thereof
17α-acyloxyprogesterones and 19-nor derivatives thereof
9(11)-dehydro-17α-acyloxyprogesterones
16-methyl-17α-acyloxyprogesterones
9(11)-dehydro-16-methyl-17α-acyloxyprogesterones
16-methylene-17α-acyloxyprogesterones
9(11)-dehydro-16-methylene-17α-acyloxyprogesterones
17α-acyloxy-16-ethylideneprogesterones
16α,17α-dimethylmethylenedioxyprogesterone
9(11)-dehydro-16α,17α-dimethylmethylenedioxyprogesterone cortisone
16-methylcortisone
21-methylcortisone
16-methylenecortisone
16α-hydroxy cortisone and the (16α,17α)-acetonide thereof
hydrocortisone
16-methylhydrocortisone
21-methylhydrocortisone
16-methylenehydrocortisone
16α-hydroxyhydrocortisone and the (16α,17α)-acetonide thereof
17α,21-dihydroxypregna-4,9(11)-diene-3,20-dione
16-methyl-17α,21-dihydroxypregna-4,9(11)-diene-3,20-dione
21-methyl-17α,21-dihydroxypregna-4,9(11)-diene-3,20-dione
16-methylene-17α,21-dihydroxypregna-4,9(11)-diene-3,20-dione
16α-hydroxy-17α,-21-dihydroxypregna-4,9(11)-diene-3,20-dione and the (16,17)-acetonide thereof
21-hydroxypregna-4,17(20)-dien-3-one
11-oxo-21-hydroxypregna-4,17(20)-dien-3-one
11,21-dihydroxypregna-4,17(20)-dien-3-one
9(11)-dehydro-21-hydroxypregna-4,17(20)-dien-3-one
3-oxopregna-4,17(20)-dien-21-oic acid (esters)
3,11-dioxopregna-4,17(20)-dien-21-oic acid (esters)
11-hydroxy-3-oxopregna-4,17(20)-dien-21-oic acid (esters)
9(11)-dehydro-3-oxopregna-4,17(20)-dien-21-oic acid (esters)
progesterone
16-methylprogesterone
11-oxoprogesterone
9(11)-dehydroprogesterone
diosgenone
21-methylprogesterone
17α-cyano-17β-hydroxyandrost-4-en-3-one
16 (α and β)-hydroxytestosterone and 19-nor derivatives
16-methyl-16,17-dehydroprogesterone
16-cyano-progesterone
16-carbalkoxyprogesterones
16-hydroxymethylprogesterone
3 - (3 - oxo - 17β - hydroxyandrost - 4 - en - 17α - yl) propionic acid
testololactone The 9α-fluoro derivatives of the above 11β-hydroxy and 11-oxo-steroids.

Following is a description by way of example of methods of carrying the invention into effect.

Example 1.—17α-acetoxy-16-methylene-6-phenylthiomethylpregna-4,6-diene-3,20-dione A mixture of 17α-acetoxy-6-bromomethyl-16-methylenepregna-4,6-diene-3,20-dione (0.2 g.) and sodium thiophenate (0.1 g.) in N-methyl-2-pyrrolidone (5 ml.) was kept at room temperature for 5 minutes. The mixture was poured into water and extracted with ether. The ether extract was washed with dilute aqueous potassium carbonate and water, dried and evaporated. Crystallisation of the residue from ethanol gave 17α-acetoxy - 16 - methylene - 6 - phenylthiomethylpregna - 4,6-diene-3,20-dione as plates, M.P. 161° C., $[\alpha]_D^{25}$—22.7° (c. 0.3 in chloroform), $\lambda_{max}$. 284 mμ. ($\epsilon$ 21,800).

Similar treatment of a stoichiometric equivalent amount of

17β-acetoxy-6-bromomethyl-19-norandrosta-4,6-dien-3-one,
17β-acetoxy-6-bromomethylandrosta-4,6-dien-3-one, and
21-acetoxy-6-bromomethyl-11β,17α-dihydroxypregna-4,6-diene-3,20-dione, and
6-bromomethyl-16α,17α-isopropylidenedioxypregna-4,6-diene-3,20-dione is productive of 17β-acetoxy-6-phenylthiomethyl-19-norandrosta-4,6-dien-3-one, and
17β-acetoxy-6-phenylthiomethylandrosta-4,6-dien-3-one, and
21-acetoxy-11β,17α-dihydroxy-6-phenylthiomethylpregna-4,6-diene-3,20-dione, and
16α,17α-isopropylidenedioxy-6-phenylthiomethylpregna-4,6-diene-3,20-dione.

Example 2.—17α-acetoxy-16-methylene-6-phenoxymethylpregna-4,6-diene-3,20-dione

A mixture of 17α-acetoxy-6-bromomethyl-16-methylenepregna-4,6-diene-3,20-dione (0.2 g.) and sodium phenoxide (0.15 g.) in N-methyl-2-pyrrolidone (4 ml.) was stirred at room temperature for 5 minutes. The product, isolated as described in Example 1, was crystallised from methanol to give 17α-acetoxy-16-methylene-6-phenoxy - methylpregna-4,6-diene-3,20-dione as prisms, M.P. 188.5° C., [α]$_D^{25}$—72.1° (c. 0.2 in chloroform), λ$_{max}$. 220 (ε 12,300) and 278 mμ (ε 23,400), and λ$_{inflexion}$ 272 (ε 21,500) and 281 mμ (ε 22,900).

Similar treatment of a stoichiometric equivalent amount of

17β-acetoxy-6-bromomethyl-19-norandrosta-4,6-dien-3-one, and
17β-acetoxy-6-bromomethylandrosta-4,6-dien-3-one, and
21-acetoxy-6-bromomethyl-11β,17α-dihydroxypregna-4,6-diene-3,20-dione, and
6-bromomethyl-16α,17α-isopropylidenedioxypregna-4,6-diene-3,20-dione is productive of 17β-acetoxy-6-phenoxymethyl-19-norandrosta-4,6-dien-3-one, and
17β-acetoxy-6-phenoxymethylandrosta-4,6-dien-3-one, and
21-acetoxy-11β,17α-dihydroxy-6-phenoxymethylpregna-4,6-diene-3,20-dione, and
16α,17α-isopropylidenedioxy-6-phenoxymethylpregna-4,6-diene-3,20-dione.

Example 3.—17α-acetoxy-16-methylene-6-(p-nitrophenoxy)methylpregna-4,6-diene-3,20-dione

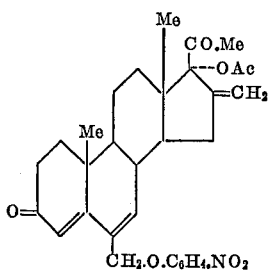

A mixture of 17α-acetoxy-6-bromomethyl-16-methylenepregna-4,6-diene-3,20-dione (0.2 g.) and sodium p-nitrophenoxide (0.35 g.) in N-methyl-2-pyrrolidone (4 ml.) was stirred at room temperature for 1 hour. The mixture was poured into water and extracted with a mixture of dichloromethane and ether. The extract was washed with water, dried and evaporated and the residue was crystallised from methanol and ethanol/acetone to give 17α-acetoxy-16-methylene-6-(p-nitrophenoxy)methylpregna-4,6-diene-3,20-dione as prisms, M.P. 203–5° C., [α]$_D^{25}$—71.5° (c. 0.45 in chloroform), λ$_{max}$. 283 mμ (ε 30,600).

Similar treatment of a stoichiometric equivalent amount of

17β-acetoxy-6-bromomethyl-19-norandrosta-4,6-dien-3-one, and
17β-acetoxy-6-bromomethylandrosta-4,6-dien-3-one, and
21-acetoxy-6-bromomethyl-11β,17α-dihydroxypregna-4,6-diene-3,20-dione, and is productive of 17β-acetoxy-6-(p-nitrophenoxy)methyl-19-norandrosta-4,6-dien-3-one, and
17β-acetoxy-6-(p-nitrophenoxy)methylandrosta-4,6-dien-3-one, and
21-acetoxy-11β,17α-dihydroxy-6-(p-nitrophenoxy)-methylpregna-4,6-diene-3,20-dione.

Example 4.—17α-acetoxy-6-methoxymethyl-16-methylenepregna-4,6-diene-3,20-dione

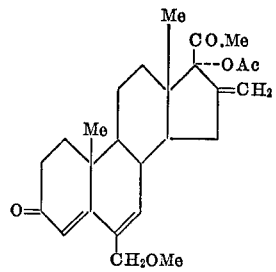

A solution of 17α-acetoxy-6-bromomethyl-16-methylenepregna-4,6-diene-3,20-dione (0.5 g.) in methanol (25 ml.) (containing 0.5 g. sodium methoxide) was refluxed for 30 minutes. The product obtained on dilution with water was crystallised from aqueous methanol to give 17α - acetoxy-6-methoxymethyl-16-methylenepregna-4,6-diene-3,20-dione as needles, M.P. 175° C., [α]$_D^{24}$—103.9° (c. 0.4 in chloroform), λ$_{max}$. 281 mμ (ε 23,590).

Similar treatment of a stoichiometric equivalent amount of

17β-acetoxy-6-bromomethyl-19-norandrosta-4,6-dien-3-one, and
17β-acetoxy-6-bromomethylandrosta-4,6-dien-3-one, and
17α-acetoxy-6-bromomethylpregna-4,6-diene-3,20-dione, and
21-acetoxy-6-bromomethyl-11β,17α-dihydroxypregna-4,6-diene-3,20-dione, and
6-bromomethyl-16α,17α-isopropylidenedioxypregna-4,6-diene-3,20-dione and also for a reflux period of 4–6 hours, of a stoichiometric equivalent amount of 17β-acetoxy-6-chloromethyl-19-norandrosta-4,6-dien-3-one, and
17β-acetoxy-6-chloromethylandrosta-4,6-dien-3-one, and
17α-acetoxy-6-chloromethylpregna-4,6-diene-3,20-dione, and
21-acetoxy-11β,17α-dihydroxy-6-chloromethylpregna-4,6-diene-3,20-dione, and
6-chloromethyl-16α,17α-isopropylidenedioxypregna-4,6-diene-3,20-dione is productive of 17β-acetoxy-6-methoxymethyl-19-norandrosta-4,6-dien-3-one, and
17β-acetoxy-6-methoxymethylandrosta-4,6-dien-3-one, and
17α-acetoxy-6-methoxymethylpregna-4,6-diene-3,20-dione, and
21-acetoxy-11β,17α-dihydroxy-6-methoxymethylpregna-4,6-diene-3,20-dione, and
6-methoxymethyl-16α,17α-isopropylidenedioxypregna-4,6-diene-3,20-dione.

Example 5.—17β-acetoxy-6-acetoxymethylandrosta-4,6-dien-3-one

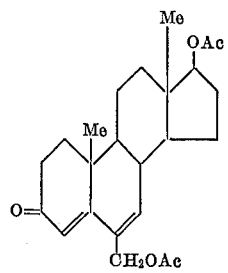

A mixture of 17β-acetoxy-6-iodomethylandrosta-4,6-dien-3-one (3.7 g.) and fused potassium acetate (15 g.) in acetone (75 ml.) was heated under reflux for 3 hours. The product, isolated as described in Example 1, was crystallised from aqueous methanol to give 17β-acetoxy-6-acetoxymethylandrosta-4,6-dien-3-one as prisms, M.P. 101–102° C., $[\alpha]_D^{25}$+47° (c. 1.0 in chloroform).

Similar treatment of a stoichiometric equivalent amount of

17β-acetoxy-6-iodomethyl-19-norandrosta-4,6-dien-3-one, and

17α-acetoxy-6-iodomethylpregna-4,6-diene-3,20-dione, and

17α-acetoxy-6-iodomethyl-16-methylenepregna-4,6-diene-3,20-dione, and 21-acetoxy-11β,17α-dihydroxy-6-iodomethylpregna-4,6-diene-3,20-dione, and 6-iodomethyl-16α,17α-isopropylidenedioxypregna-4,6-diene-3,20-dione is productive of 17β-acetoxy-6-acetoxymethyl-19-norandrosta-4,6-dien-3-one, and 17α-acetoxy-6-acetoxymethylpregna-4,6-diene-3,20-dione, and 17α-acetoxy-6-acetoxymethyl-16-methylenepregna-4,6-diene-3,20-dione, and 21-acetoxy-6-acetoxymethyl-11β,17α-dihydroxypregna-4,6-diene-3,20-dione, and 6-acetoxymethyl-16α,17α-isopropylidenedioxypregna-4,6-diene-3,20-dione.

Example 6.—17α-acetoxy-6-ethylthiomethyl-16-methylenepregna-4,6-diene-3,20-dione

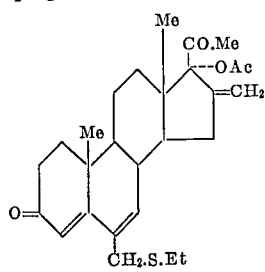

A mixture of 17α-acetoxy-6-bromomethyl-16-methylenepregna-4,6-diene-3,20-dione (0.5 g.) and sodium thioethoxide (0.25 g.) in N-methyl-2-pyrrolidone (10 ml.) was kept at room temperature for 2 minutes and then diluted with ether. The ether solution was washed with dilute aqueous potassium carbonate and water, dried and evaporated to dryness. The residue was chromatographed in benzene solution on neutral alumina. Elution with benzene containing 10% ether gave 17α-acetoxy-6-ethylthiomethyl-16-methylenepregna-4,6-diene-3,20 - dione, $\lambda_{max}$. 282 mμ (ε, 20,500).

Similar treatment of a stoichiometric equivalent amount of

17β-acetoxy-6-bromomethyl-19-norandrosta-4,6-dien-3-one, and

17β-acetoxy-6-bromomethylandrosta-4,6-dien-3-one, and

17α-acetoxy-6-bromomethylpregna-4,6-diene-3,20-dione, and 21-acetoxy-6-bromomethyl-11β,17α-dihydroxypregna-4,6-diene-3,20-dione, and 6-bromomethyl-16α,17α-isopropylidenedioxypregna-4,6-diene-3,20-dione is productive of 17β-acetoxy-6-ethylthiomethyl-19-norandrosta-4,6-dien-3-one, and 17β-acetoxy-6-ethylthiomethylandrosta-4,6-dien-3-one, and 17α-acetoxy-6-ethylthiomethylpregna-4,6-diene-3,20-dione, and 21-acetoxy-11β,17α-dihydroxy-6-ethylthiomethylpregna-4,6-diene-3,20-dione, and 6-ethylthiomethyl-16α,17α-isopropylidenedioxypregna-4,6-diene-3,20-dione.

Example 7.—16α,17α-isopropylidenedioxy-6-(p-nitrophenoxy)-methylpregna-4,6-diene-3,20-dione

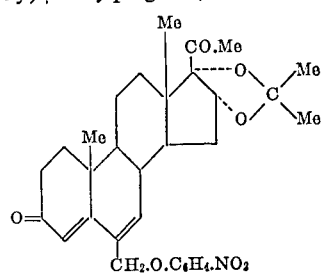

A mixture of 6-bromomethyl-16α,17α-isopropylidenedioxypregna-4,6-diene-3,20-dione (200 mg.) and sodium p-nitrophenoxide (0.35 g.) in N-methyl-2-pyrrolidone (4 ml.) was stirred for 1 hour at room temperature. The product was isolated with ether and crystallised from ethanol to give 16α,17α-isopropylidenedioxy-6-(p-nitrophenoxy)methylpregna-4,6-diene-3,20-dione, as needles, M.P. 227° C., $[\alpha]_D^{27}$+93.5° (c. 0.8 in chloroform), $\lambda_{max}$. 284 mμ (ε,30,900).

Example 8.—17α-acetoxy-6-(p-nitrophenoxy)methylpregna-4,6-diene-3,20-dione

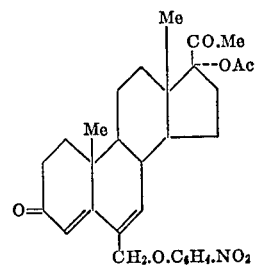

A mixture of 17α-acetoxy-6-bromomethylpregna-4,6-diene-3,20-dione (200 mg.) and sodium p-nitrophenoxide (0.35 g.) in N-methyl-2-pyrrolidone (4 ml.) was stirred for 1 hour at room temperature. The mixture was poured into water and the product isolated with a mixture of dichloromethane and ether. Crystallisation from ethyl acetate gave 17α-acetoxy-6-(p-nitrophenoxy-methylpregna-4,6-diene-3,20-dione, M.P. 241–243° C., $[\alpha]_D^{26}$+34° (c. 0.2 in chloroform), $\lambda_{max}$. 283 mμ (ε, 30,200).

Example 9.—17α-aectoxy-6-phenoxymethylpregna-4,6-diene-3,20-dione

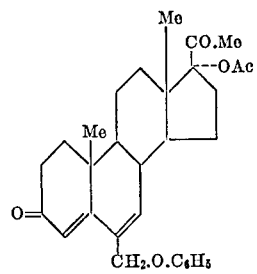

A mixture of 17α-acetoxy-6-bromomethylpregna-4,6-diene-3,20-dione (200 mg.) and sodium phenoxide (200 mg.) in N-methyl-2-pyrrolidone (4 ml.) was stirred for 1 hour at room temperature. The product was isolated with ether, and crystallised from ethanol to give 17α-acetoxy-6 - phenoxymethylpregna-4,6-diene-3,20-dione, as plates, M.P. 177° C., $[\alpha]_D^{28}$+31° (c. 0.2 in chloroform), $\lambda_{max}$. 278 mμ (ε, 23,100).

Example 10.—17α-acetoxy-6-phenylthiomethylpregna-4,6-diene-3,20-dione

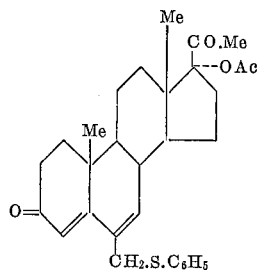

A mixture of 17α-acetoxy-6-bromomethylpregna-4,6-diene-3,20-dione (200 mg.) and sodium thiophenate (200 mg.) in N-methyl-2-pyrrolidone (2 ml.) was stirred for ½ hour at room temperature. The mixture was poured into water and the product isolated with a mixture of dichloromethane and ether. Crystallisation from ethanol gave 17α - acetoxy-6-phenylthiomethylpregna-4,6-diene-3,20-dione as needles, M.P. 185° C., $[\alpha]_D^{26}+75°$ (c. 0.9 in chloroform), $\lambda_{max}$. 284 mμ ($\epsilon$, 21,100).

Example 11.—17α-acetoxy-6-(p-phenylphenoxy)methylpregna-4,6-diene-3,20-dione

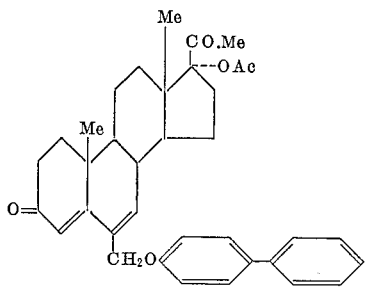

A mixture of 17α-acetoxy-6-bromomethylpregna-4,6-diene-3,20-dione (200 mg.) and sodium p-phenylphenoxide (200 mg.) in N-methyl-2-pyrrolidone (2 ml.) was stirred for 1 hour at room temperature. The mixture was poured into water and the product isolated with ether. Crystallisation from ethanol/acetone gave 17α-acetoxy-6-(p-phenylphenoxy)methylpregna - 4,6-diene-3,20-dione, as prisms, M.P. 194° C., $[\alpha]_D^{27}+36°$ (c. 0.7 in chloroform).

Example 12.—17α-acetoxy-6-(o-phenylphenoxy)methylpregna-4,6-diene-3,20-dione

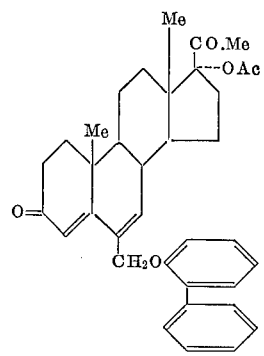

A mixture of 17α-acetoxy-6-bromomethylpregna-4,6-diene-3,20-dione (200 mg.) and sodium o-phenylphenoxide (200 mg.) in N-methyl-2-pyrrolidone (2 ml.) was stirred for 2 hours at room temperature. The mixture was poured into water and the product isolated with a mixture of dichloromethane and ether. Crystallisation from acetone gave 17α-acetoxy-6-(o-phenylphenoxy)methylpregna-4,6-diene-3,20-dione as needles, M.P. 215–216° C., $[\alpha]_D^{26}+17°$ (c. 0.7 in chloroform), $\lambda_{max}$. 282 mμ ($\epsilon$, 22,500).

We claim:
1. A process for the preparation of 6-oxy-(thio)methyl steroidal-4,6-dien-3-ones having the formula

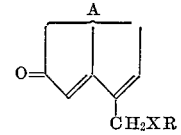

(I)

where X is —O— or —S—, R is selected from the group consisting of alkyl and aryl groups containing up to 20 carbon atoms, and A is the remainder of the steroid molecule, which process comprises reacting a 6-halomethyl-4,6-dien-3-one including the partial formula

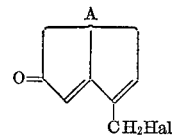

(II)

where Hal is Cl, Br, or I, with a metallic salt of the formula M.X.R where M is Na, K or Li and A, X and R have the same meaning as above.

2. A process as claimed in claim 1 wherein the process is carried out in solution or suspension in a dry organic solvent.

3. A compound selected from the group consisting of pregna-4,6-diene-3-, 20-dione and androsta-4,6-dien-3-one derivatives having at $C_6$ the group $CH_2XR$ wherein, X is an atom of oxygen or sulfur, and R is an alkyl or aryl group containing up to 20 carbon atoms.

4. 17α - acetoxy - 16 - methylene-6-phenylthiomethylpregna-4,6-diene-3,20-dione.

5. 17α - acetoxy-16-methylene-6-phenoxymethylpregna-4,6-diene-3,20-dione.

6. 17α - acetoxy - 16 - methylene - 6-(p-nitrophenoxy)-methylpregna-4,6-diene-3,20-dione.

7. 17α - acetoxy - 6 - methoxymethyl-16-methylenepregna-4,6-diene-3,20-dione.

8. 17β - acetoxy - 6 - acetoxymethylandrosta-4,6-dien-3-one.

9. 17α - acetoxy - 6 - ethylthiomethyl - 16-methylenepregna-4,6-diene-3,20-dione.

10. 16α,17α - isopropylidenedioxy - 6 - (p-nitrophenoxy)methylpregna-4,6-diene-3,20-dione.

11. 17α - acetoxy - 6 - (p-nitrophenoxy)methylpregna-4,6-diene-3,20-dione.

12. 17α - acetoxy - 6 - phenoxymethylpregna-4,6-diene-3,20-dione.

13. 17α - acetoxy - 6 - phenylthiomethylpregna-4,6-diene-3,20-dione.

14. 17α - acetoxy - 6 -(p-phenylphenoxy)methylpregna-4,6-diene-3,20-dione.

15. 17α - acetoxy - 6 - (o-phenylphenoxy)methylpregna-4,6-diene-3,20-dione.

References Cited
UNITED STATES PATENTS 3,239,541   3/1966   Bowers et al.

HENRY A. FRENCH, *Primary Examiner.*

U.S. Cl. X.R.

260—397.1, 397.3, 397.4, 397.45, 397.47, 999